United States Patent [19]
Arimilli et al.

[11] Patent Number: 5,526,512
[45] Date of Patent: Jun. 11, 1996

[54] DYNAMIC MANAGEMENT OF SNOOP GRANULARITY FOR A COHERENT ASYNCHRONOUS DMA CACHE

[75] Inventors: Ravi K. Arimilli, Round Rock; Dennis G. Gregoire; Amy M. Youngs, both of Austin, all of Tex.

[73] Assignee: International Business Machines Corporation, Armonk, N.Y.

[21] Appl. No.: 123,820

[22] Filed: Sep. 20, 1993

[51] Int. Cl.$^6$ ...................................................... G06F 13/00
[52] U.S. Cl. .......................... 395/473; 395/445; 395/457; 395/468; 364/242.3; 364/243.41; 364/270.6; 364/DIG. 1; 364/964.27; 364/DIG. 2
[58] Field of Search ................................. 395/445, 473, 395/457, 468; 364/242.3, 243.41

[56] References Cited

U.S. PATENT DOCUMENTS

| | | | |
|---|---|---|---|
| 4,945,486 | 7/1990 | Nitschke et al. | 364/431.1 |
| 5,025,365 | 6/1991 | Mathur et al. | 395/425 |
| 5,072,369 | 12/1991 | Theus et al. | 395/425 |
| 5,119,485 | 6/1992 | Ledbetter, Jr. et al. | 395/425 |
| 5,133,074 | 7/1992 | Chou | 395/425 |
| 5,193,170 | 3/1993 | Lam | 395/425 |
| 5,202,973 | 4/1993 | Ramanujan et al. | 395/425 |
| 5,222,229 | 6/1993 | Fujuda et al. | 395/550 |
| 5,228,134 | 7/1993 | MacWilliams et al. | 395/425 |
| 5,228,135 | 7/1993 | Ikumi | 395/425 |
| 5,263,142 | 11/1993 | Watkins et al. | 395/425 |
| 5,287,482 | 2/1994 | Arimilli et al. | 395/425 |
| 5,293,603 | 3/1994 | MacWilliams et al. | 395/425 |
| 5,325,503 | 6/1994 | Stevens et al. | 395/425 |
| 5,355,467 | 10/1994 | MacWilliams et al. | 395/425 |
| 5,398,325 | 3/1995 | Chang et al. | 395/425 |
| 5,418,927 | 5/1995 | Chang et al. | 395/425 |

FOREIGN PATENT DOCUMENTS

| | | |
|---|---|---|
| 0409556A2 | 7/1990 | European Pat. Off. . |
| 0559409A1 | 8/1993 | European Pat. Off. . |
| WO90/03002 | 8/1989 | WIPO . |
| WO93/01552 | 6/1992 | WIPO . |

*Primary Examiner*—Tod R. Swann
*Assistant Examiner*—Frank J. Asta
*Attorney, Agent, or Firm*—Mark E. McBurney

[57] ABSTRACT

A system and method dynamically changes the snoop comparison granularity between a sector and a page, depending upon the state (active or inactive) of a direct memory access (DMA) I/O device which is writing to a device on the system bus asynchronously when compared to the CPU clock. By using page address granularity, erroneous snoop hits will not occur, since potentially invalid sector addresses are not used during the snoop comparison. Sector memory addresses may be in a transition state at the time when the CPU clock determines a snoop comparison is to occur, because this sector address has been requested by a device operating asynchronously with the CPU clock. Once the asynchronous device becomes inactive the system dynamically returns to a page and sector address snoop comparison granularity.

17 Claims, 4 Drawing Sheets

DYNAMIC MANAGEMENT OF SNOOP GRANULARITY FOR A COHERENT ASYNCHRONOUS DMA CACHE

BACKGROUND OF THE INVENTION

1. Field of the Invention

The present invention relates to providing cache coherency in a computer system having a central processing unit (CPU) and other devices that monitor the system bus by "snooping". More specifically, coherency is maintained between asynchronous buses by altering the criteria used to compare and identify the memory address of data owned by a first device and requested by another device.

2. Description of Related Art

A problem exists with conventional multi-cache systems having asynchronous buses and a snooping protocol in that a time period exists when the address of data being written to a cache is invalid. If a snoop comparison occurs during this time period (due to the asynchrony between the update and the snoop comparison) an erroneous response may cause performance degradation or incorrect data in the system. This erroneous response may include a false snoop hit, or an actual snoop hit that was not identified. More particularly, due to the asynchronous nature of input/output (I/O) devices writing to, or reading from, a cache memory included in an input/output channel controller (IOCC), a period of time exists when the I/O device is ending its interaction with one memory sector and beginning to interact with another memory sector. Thus, the sector address used for a snoop comparison is in a state of transition such that if a snoop of the system bus occurs during the address transition time period, then an erroneous snoop hit or failure to detect a snoop hit may occur.

A conventional solution for maintaining cache coherency is described by U.S. Pat. No. 5,119,485 which involves coupling an encoded control signal from an alternate busmaster to a bus interface control circuit to selectively enable data bus snooping. U.S. Pat. No. 5,072,369 discusses mapping addresses across different buses to ensure coherency. That is, an interface circuit maps selected bus addresses to corresponding addresses on another bus such that when a busmaster on a first bus attempts to read or write a bus interface circuit responds by accessing a corresponding address in the memory of the second bus.

Another method of cache coherency is described by U.S. Pat. No. 5,025,365 which has distributed directories which allow updates of each cache memory at different time periods. This causes directory inconsistencies to occur during the period between updates. A system bus protocol is arranged to provide a periodic correct operation to maintain, data coherency by updating the distributed directories. U.S. Pat. No. 5,193,170 includes a CPU, RAM and ROM. During a ROM mapped to RAM mode a snoop cycle is implemented to detect any CPU write operations and, if detected, a cache invalidation signal is sent to the CPU. U.S. Pat. No. 4,945, 486 includes a series of processors connected through a shared data bus with each processor generating a synchronization request signal. A synchronization controller broadcasts the processor status on a synchronization bus, thereby enabling snooping of the bus to monitor communications.

It can be seen that conventional systems use various techniques, such as mapping, distributed directories, synchronization processor, enabling bits, and the like to maintain cache coherency. These conventional systems solve cache coherency problems in a synchronous system, but do not address the additional problems encountered when at least two buses in the system are asynchronous. Therefore, it can be seen that a system which redefines existing parameters in a system to provide cache coherency between asynchronous buses without the need for additional complex logic would be extremely advantageous.

SUMMARY OF THE INVENTION

In contrast to the prior art, the present invention, uses a dynamically redefined level of detail (granularity) to identify a snoop hit such that cache coherency is maintained between asynchronous buses.

Broadly, the present invention uses, at certain times, a page address rather than a sector address for a snoop comparison, i.e. to determine whether a snoop hit has occurred.

A page of memory as used herein is a set of memory sectors wherein a page may be 4K bytes and a sector 32 bytes, such that there are 128 sectors per page. A memory address includes both a page address and sector address. Normally, a system maintains cache coherency at the sector level, i.e. a snoop hit is considered to have occurred if both the page and the sector addresses are the same. However, the present invention dynamically changes the snoop comparison granularity between a sector and a page, depending upon the state (active or inactive) of a direct memory access (DMA) operation which proceeds asynchronously when compared to the CPU clock. By using page address granularity, the present invention ensures that erroneous snoop hits will not occur, since the potentially invalid sector addresses are not used during the snoop comparison.

When the busmaster requests a page address change, the DMA operation is rendered inactive by holding off the busmaster, and the IOCC snoop compare address is updated synchronously with the CPU clock. Thus, if a busmaster device requests data at a page address other than the one the IOCC is currently using the data processing system of the present invention automatically places the busmaster in an inactive state.

When a DMA operation is active the busmaster device is asynchronously interacting with the level 1 (L1) cache contained in a device such as an IOCC. This causes the IOCC to update the address used for a snoop comparison asynchronously, since the busmaster controls a command clock which is independent of the CPU clock. In accordance with the present invention, the IOCC snoops a system bus only on a page address basis during such periods of DMA activity.

Using a page granularity, a snoop hit may occur if another device requests data from a memory sector on the same page as the sector that the DMA busmaster is currently accessing. In this case, the IOCC holds off the other device by issuing an ARTRY_signal until the DMA activity is complete. Once the DMA operation is complete or becomes temporarily inactive, the requested memory access is then allowed to proceed. In the case where the busmaster is writing to memory the requesting device will get access to the updated copy. Also, when the DMA operation is inactive, the addresses of the data owned by the IOCC are static such that no transitional phase is present that could cause a sector address to be invalid and the snoop comparison granularity returns to the sector address level.

More particularly, assume an I/O busmaster is reading data from the IOCC cache, i.e. the busmaster requests various memory addresses until all of the data is read, or some type of cessation condition occurs. During such periods of DMA activity, the busmaster may cause the sector portion of the snoop comparison address to be updated during the snoop comparison operation, this occurs when another device requests data at a sector address which is on the same page as the data being accessed by the busmaster. In such a case, an ARTRY_signal is issued holding off the requesting device until the busmaster activity is complete, thereby maintaining coherency.

Therefore, the data processing system of present invention will not fail to detect a possible snoop hit, because the memory address comparison is made between page addresses and not sector addresses. In this manner the potential invalidity of the sector portion of the memory address during the transition between memory sectors is avoided and cache coherency is assured.

As noted above, if the memory address requested by the DMA busmaster crosses a page boundary, processing is interrupted and the snoop comparison is reset to become synchronous with the CPU clock, thereby maintaining coherency.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
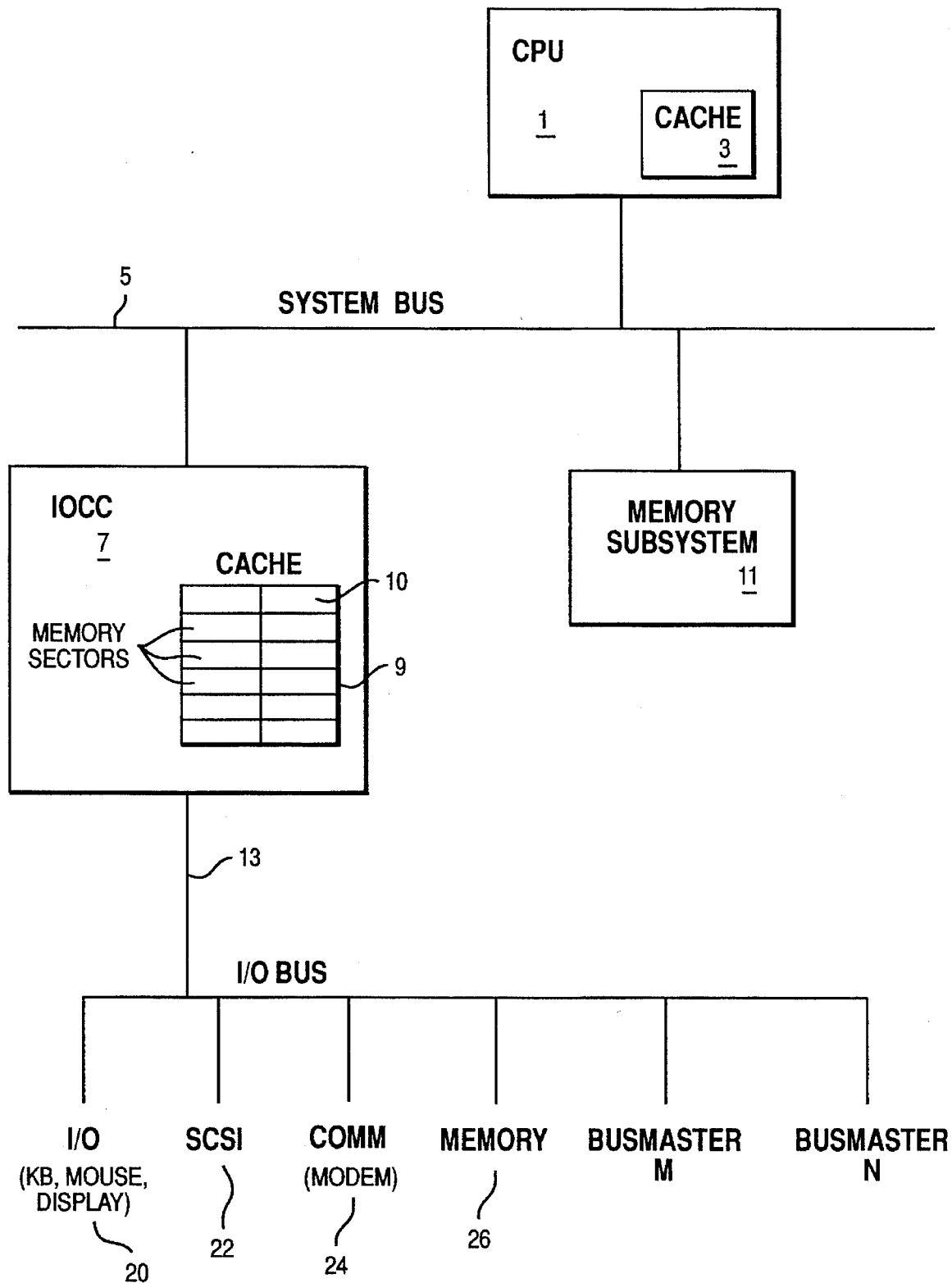
FIG. 1 is a block diagram of a data processing system capable of utilizing the present invention.

Referring to FIG. 1, the block diagram of a data processing system capable of utilizing the present invention is shown wherein reference numeral 1 is a central processing unit having a level 1 (L1) cache 3 internal thereto. CPU can be any one of several commercially available processors, such as the PowerPC 601 Microprocessor (PowerPC is a trademark of IBM Corp.). System bus 5 connects CPU 1 with input/output channel controller 7 and memory subsystem 11 which includes a memory control chip and the actual physical locations of random access memory. IOCC 7 includes an L1 cache 9 having a plurality of memory sectors 10 each capable of storing 32 bytes of data. Input/output bus 13 is shown also connected to IOCC 7 such that a plurality of I/O peripheral devices including a keyboard, mouse, display, small computer system interface (SCSI), communication devices, bus memory, and possibly one or more additional I/O busmaster devices (M, N), are all connectable to CPU 1 and memory 11 via IOCC 7. It should be noted that system bus 5 and I/O bus 13 have an asynchronous relation with respect to the timing of data transfers thereon. That is system bus 5 is driven by CPU 1 which includes a clock having a first speed, whereas I/O bus 13 is driven by a particular I/O busmaster device which has its own independent clock, and controls the transfer of data between itself and IOCC cache 9. Therefore, address sampling periods on the two buses will be asynchronous. Additionally, the data processing system shown in FIG. 1 includes a snooping protocol wherein a device which owns a valid (and possibly modified) copy of a given memory sector will snoop system bus 5 in order to determine if any other devices connected thereto are requesting access to the data. If the snooping comparison determines that another device is requesting the data, a snoop hit is said to occur wherein the device owning the data will take whatever actions are necessary to maintain coherency. These actions may include invalidating the data in the owner's cache, writing back the modified data to memory, sharing the unmodified data with other devices, and the like. Thus, IOCC 7 also includes a snooping function wherein system bus 5 is monitored for the address of the data contained in L1 cache 9 in order to determine if a snoop hit occurs.

Figure 5:
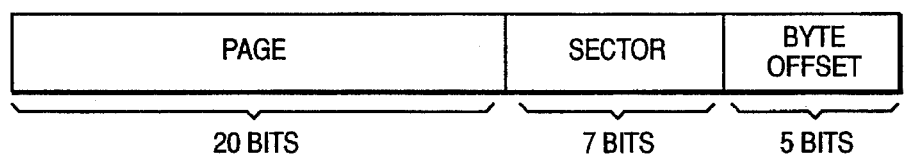
FIG. 5 is a representative memory address showing the level of detail needed to identify the page, sector and byte offset of the memory location.

In a preferred embodiment of the present invention, memory subsystem 11 is organized on a page, sector and byte offset hierarchical system. That is, each memory address includes a portion indicating the page address, sector address and byte offset. Using the PowerPC memory address mapping scheme as an example, each memory address is 32 bits long of which 20 bits are utilized to identify the specific page, 7 bits are used to identify the sector and 5 bits are utilized to identify the byte offset within a sector. Each page includes 4K bytes of memory and each sector storing 32 bytes, such that a 128 sectors of 32 bytes each are present in each 4K byte page. The byte offset amount may be varied, but quantities of 1, 4 or 8 bytes are preferred. FIG. 5 shows a memory address and the number of bits allocated for each portion, i.e. page, sector and byte offset. Under normal snooping conditions, the entire memory address as shown in FIG. 5 is placed on the system bus by the device desiring access to the data at that address. The device which currently owns the desired data then snoops the system bus and compares the address on the bus with the address of the data owned and if the page and sector are identical then a snoop hit occurs. This comparison is done on a page and sector basis such that coherency maintenance actions are taken relative to the individual sector subject to the snoop hit.

Figure 4:
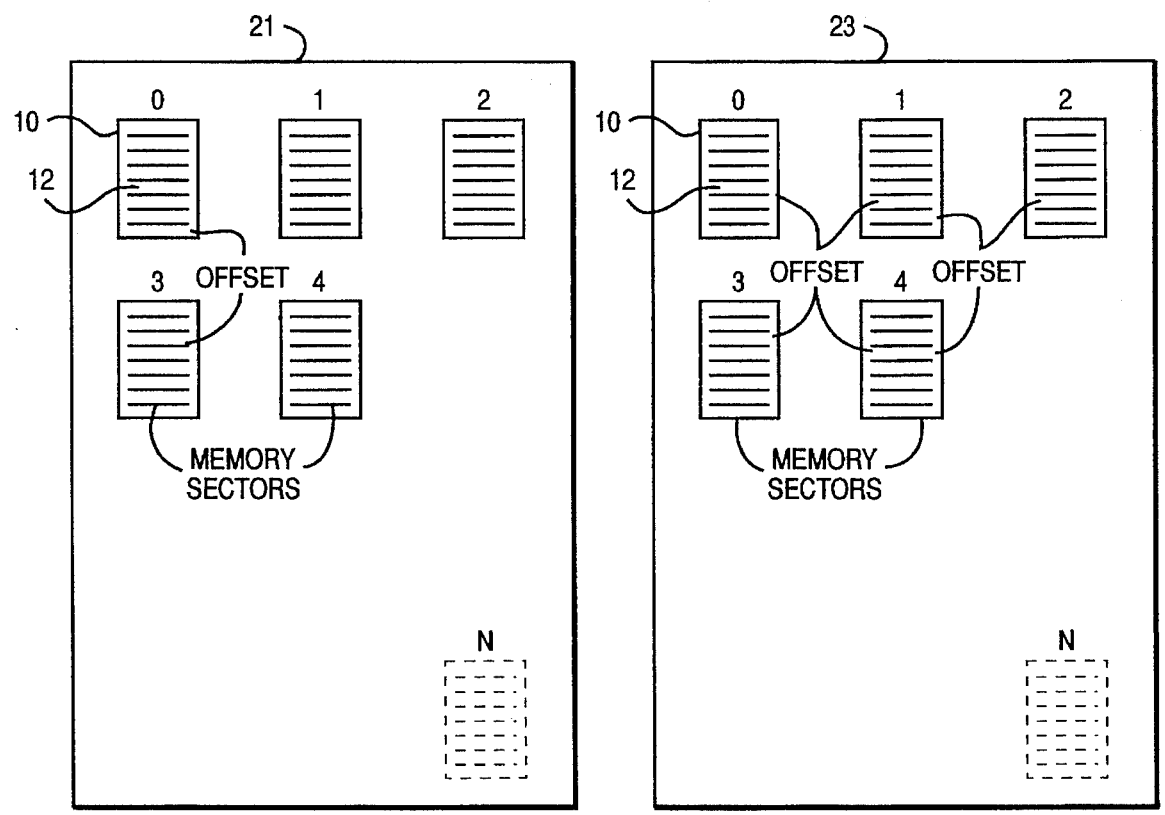
FIG. 4 shows pages of memory, each having a plurality of sectors capable of being written to by an I/O busmaster DMA device.

FIG. 4 shows two representative 4K byte pages utilized by the memory subsystem of the present invention to divide addresses for data stored therein. These pages 21 and 23 are shown including a plurality of 32 byte memory sectors 10 labeled from zero through N, where N equals 128 in a preferred embodiment. Each of the 32 byte sectors are shown having a plurality of byte offset portions 12 (which in preferred embodiment will equal eight four byte sections). It can be seen that each one of the individual byte offset portions 12 will have a distinct address, such as the 32 bit memory address shown in FIG. 5. As noted above, normal snooping operations will compare the page and sector portions of 32 bit address in order to determine if a snoop hit occurs.

Figure 7:
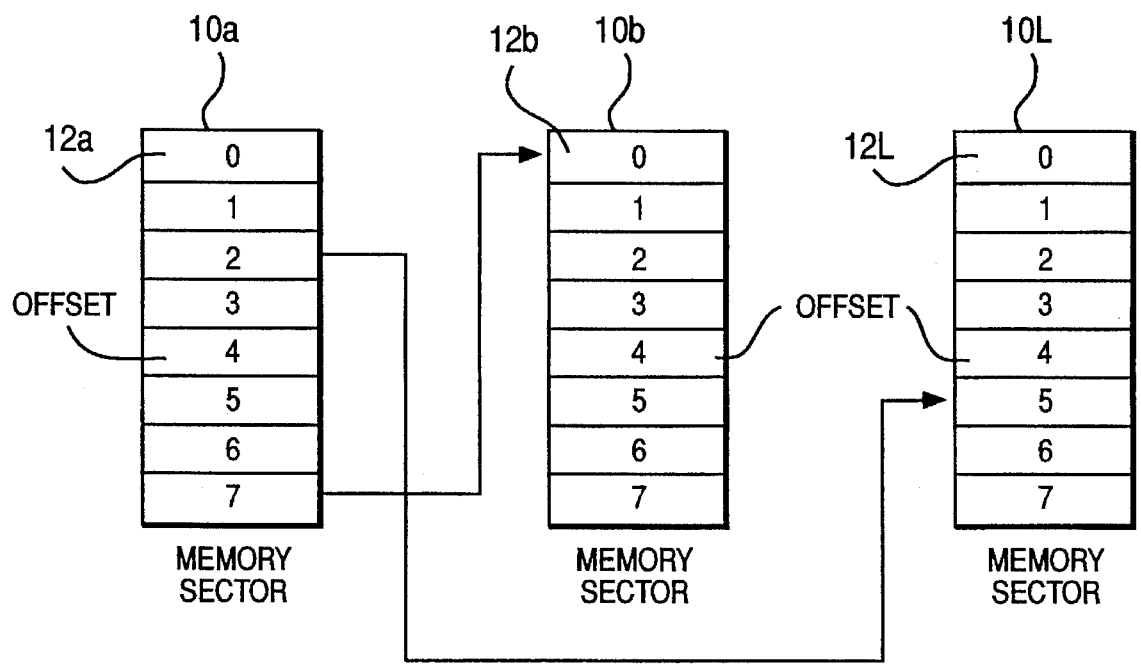
FIG. 7 is a diagram showing the individual 4 byte word offset portions of plural 32 byte memory sectors.

FIG. 7 is a diagram showing a further breakdown of representative 32 byte sectors 10A, 10B and 10L, each having eight four byte offset portions 12A, 12B and 12L, respectively. These byte offset portions 12 are designated 0–7.

The data processing system of the present invention provides for direct memory access (DMA) between I/O devices 20, 22, 24 and 26 and memory 11, mediated by IOCC 7. This means that data may be transferred between these I/O devices and memory 11 without any intervention by CPU 1. Thus, if an I/O device is programmed to read data from memory subsystem 11, the I/O device 24 initially arbitrates for ownership of bus 13 and then provides an address to IOCC 7 corresponding to a location in memory 11 from where the data is to be read. The IOCC loads a copy of the desired sector into its cache 9 and then allows the I/O device to access the copy using bus 13.

In a particular example, a DMA I/O busmaster device, such as a SCSI device (reference 22 of FIG. 1), or the like, will initiate a data transfer operation, such as a read from memory 11. The busmaster device will arbitrate for ownership of I/O bus 13. The busmaster device then presents an address to IOCC 7 for the data to be read, and uses an internal command clock to signal when IOCC 7 is to use the address and obtain the data from memory 11. When the busmaster device has completed reading the data from the sector of memory corresponding to the presented address and, if more data is to be read, another address is presented to IOCC 7 and the command clock defines when it is to be obtained. As previously noted, this command clock is asynchronous with the CPU clock, which indicates when the IOCC is to perform a snoop comparison. The busmaster device then periodically presents a new memory address and activates a signal from the command clock every time the memory address is to be changed before the next portion of data is to be read. This command clock timing is chosen by the DMA busmaster device and is asynchronous with any clock signals generated by the CPU 1 or used by IOCC 7 for other purposes.

Referring to FIG. 7, it is illustrated how a busmaster device may request a data read to byte offset portion 2 in memory sector 10A. The busmaster device has presented this address to IOCC 7 and pulsed the command clock such that ownership of the data will be obtained. The read operation then occurs and the busmaster device may then provide another sector address, e.g. byte offset 5 of memory sector 10L. It can be seen that a sector address transition will occur between 32 byte sector 10A and 10L such that the sector address as shown in FIG. 5 will be changed due to a command clock signal from a DMA busmaster device subsequent to the data being read from byte offset 2 of 32 byte sector 10A. It will be understood that the present invention is also applicable to a "streaming" data transfer wherein the busmaster device provides an initial sector address to IOCC 7, which then increments the address at each pulse of a strobe signal provided by the busmaster device. The streaming data example is shown in FIG. 7 when the busmaster has requested byte offset 7 of sector 10A and IOCC 7 increments the address to byte offset 0 of sector 10B, thus causing a sector address transition to occur.

Figure 2:
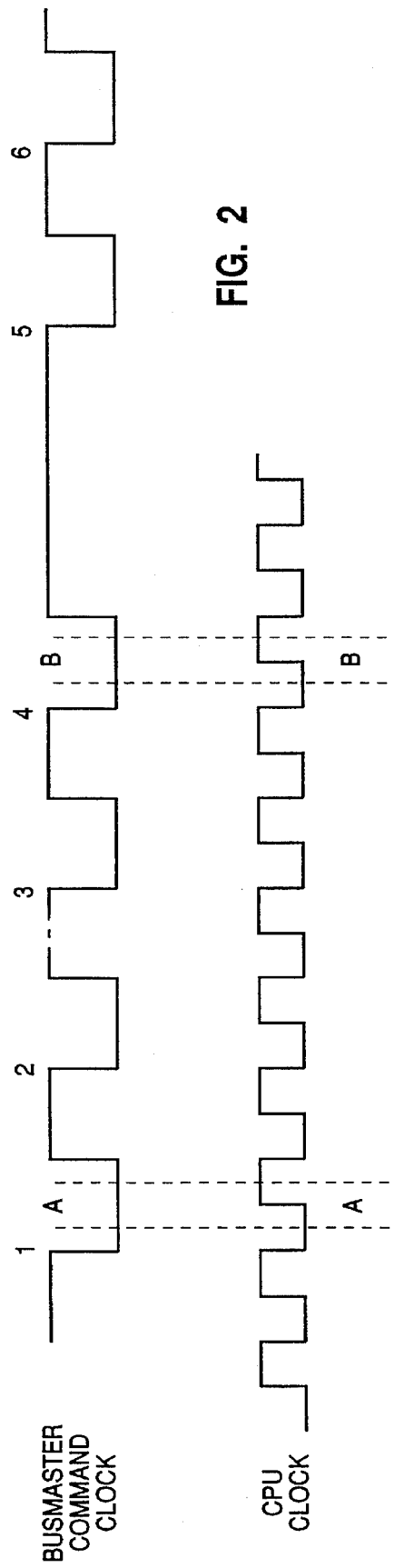
FIG. 2 shows clock signals illustrating the asynchronous nature of the data write operations to an input/output control chip from a busmaster device on the I/O bus.

FIG. 2 is an example of a command clock signal which may be used by a DMA busmaster device accessing in cache 9 of IOCC 7. For each cycle, a busmaster device has presented a new sector memory address to IOCC 7, and at each trailing edge 1–6, the busmaster is beginning to read from the new address location. Again, when IOCC 7 changes the memory address from, e.g. byte offset portion 2 of 32 byte sector 10A to byte offset portion 5 of memory sector 10L (FIG. 7) a transitional phase occurs wherein the 7 bit sector address (FIG. 5) will change.

Figure 6:
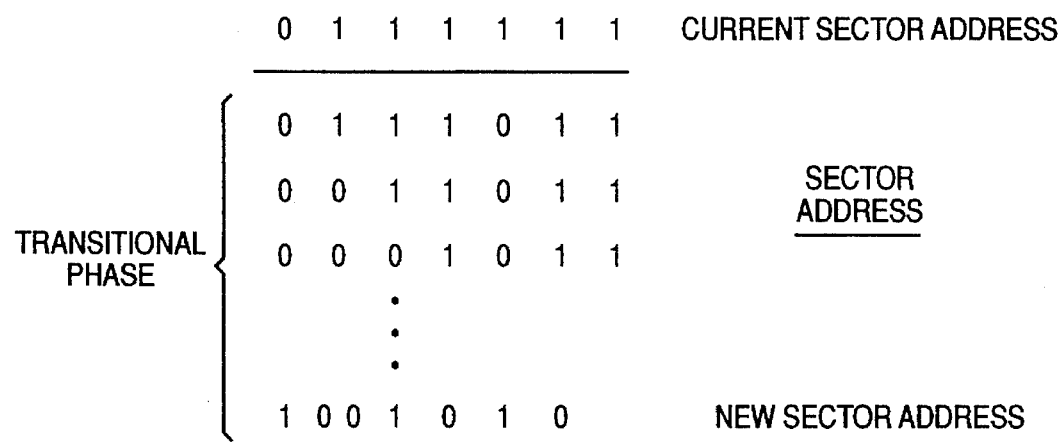
FIG. 6 shows an example of the actual bits of a sector address which are subject to change and are responsible for the problem solved by the present invention.

FIG. 6 shows an example of the type of address transition which may occur. For example, assume the sector address for 32 byte sector 10A is 0111111. When busmaster device requests data to be read from a new sector, such as sector 10L, e.g. when a trailing edge 1–6 of clock signal is received by IOCC 7, the address for sector 10A may be incremented by 11 (binary 1011) to the address for sector 10L. Thus, the 7 bit sector address for 32 byte sector 10L would be 1001010, which is obtained by performing binary addition. However, there is a period of time in which the state of the sector address from sector 10A has not yet reached the accurate value for sector 10L. That is, all of the bits have not yet been corrected such that IOCC 7 contains the accurate sector address for 32 byte sector 10L. FIG. 6 shows several potential transition stages wherein the correct address for sector 10a (0111111) has not yet been completely changed to the correct address of sector 10L (1001010). This transitional phase is shown alongside the strobe signal of FIG. 2 as periods A and B which indicate the trailing edge at points 1 and 4 have the potential to cause a change in memory sector, as previously described with regard to FIG. 7.

It should be noted that this transition period is due to the latent timing delays inherent in the logic of IOCC 7. For example, when the busmaster command clock requests a memory sector change, there is a transition period between the time when the new address is requested and the IOCC logic calculates the new address and replaces the previous sector address in a latch.

Therefore, those skilled in the art will understand that if a snoop operation occurs synchronously with CPU 1 clock during a transitional phase shown in FIG. 6 (i.e. when the CPU clock defines an address sampling period for a snoop comparison to match period A or B of FIG. 2), an erroneous snoop hit may occur or a valid snoop hit maybe omitted wherein the device snooping system bus 5 will fail to determine that IOCC 7 owns data corresponding to one of the transitional sector address, when in fact IOCC 7 does own this data, thereby creating a situation where cache 9, cache 3 and memory 11 may become non-coherent due to the improper response given during the transitional phase. During the time when IOCC 7 owns a memory sector, it performs snooping on the system bus. CPU bus protocol signals are used to determine that a particular bus cycle is a "snoop window".

Figure 3:
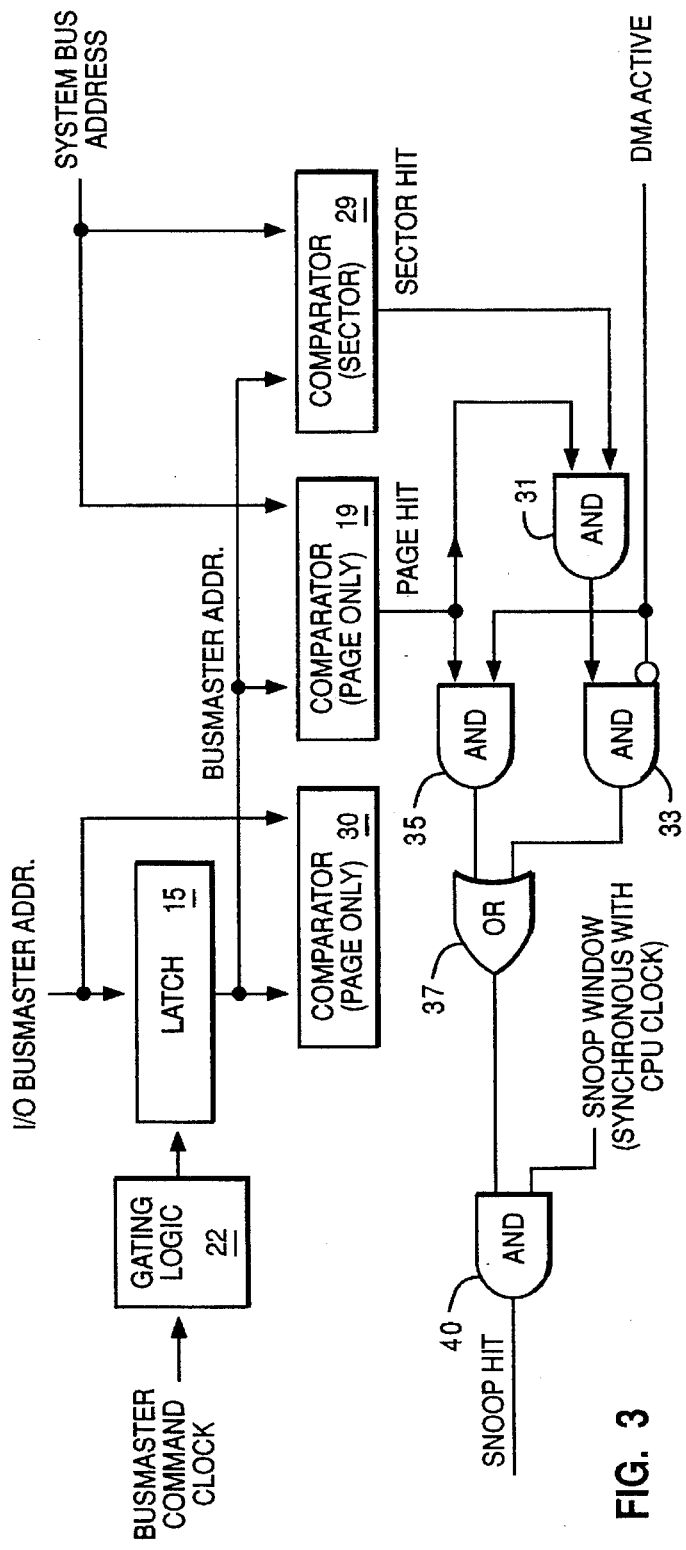
FIG. 3 is a schematic diagram of the logic components utilized by the present invention to provide cache coherency in a system with snooping protocol.

FIG. 3 shows the hardware logic utilized by the present invention, and included in IOCC 7, to determine if a snoop hit has occurred. Latch 15 receives the address presented by the I/O busmaster during data transfer operations. The busmaster device also inputs the command clock of FIG. 2 (appropriately conditioned by gating logic 22) to latch 15 which indicates when the memory address is to be latched. In order to determine if a snoop hit occurs IOCC 7 also includes a page comparator 19 and sector comparator 29, which receive an address from system bus 5 corresponding to a data location which is desired by another device connected to the system bus 5 and capable of accessing memory 11. The address in latch 15 is also provided to comparators 19 and 29 and includes the memory address of the data in I/O cache 9 being accessed by I/O busmaster device.

Additionally, a page only comparator 30 is provided which determines if the busmaster device has requested access to data on another page, thus causing the system to deactivate the busmaster and reset the busmaster address latch synchronously with the CPU clock. The memory address provided by the busmaster and the memory address from the system bus are then compared. If the pages are identical, a page hit occurs and a corresponding signal is output to AND gates 31 and 35. If the sector addresses are identical, then a sector hit occurs and a signal is output from comparator 29 to AND gate 31. If the page hit signal and the sector hit signal are both valid, then a signal is output from AND gate 31 to AND gate 33. Next, a signal indicating the state of the DMA operation is input to AND gates 33 and 35. The DMA busmaster active signal is inverted prior to being input to AND gate 33. The output of both AND gates 33 and 35 are input to an OR gate 37, which then outputs a signal to AND gate 40, which also receives a signal, defined by the CPU clock (FIG. 2) indicating that snoop comparison is to occur.

Therefore, it can be seen from FIG. 3 how the present invention allows the snoop comparison address granularity to be dynamic, based upon the state of the DMA busmaster device. That is, if the DMA signal of FIG. 3 is inactive, then a valid signal is input to AND gate 33. If both a page and sector hit occur, based on the signal from AND gate 31, gate 33 will then output a valid signal to OR gate 37. AND gate 40 will then output a signal indicating a snoop hit occurred, if the signal from OR gate 37 is present when the snoop window signal is input. Thus, the CPU bus clock is used to determine the time when the IOCC 7 is to sample its internal logic to determine if a snoop hit has occurred. In this manner, when the DMA busmaster device is inactive, snoop comparisons are implemented on a sector granularity basis. However, if the DMA active signal is active, then a valid signal will be input to AND gate 35 and not gate 33. Thus, a page hit signal from comparator 19 and the DMA active signal will cause a signal to be output to OR gate 37 and on to AND gate 40. In this manner, gate 40 will indicate the existence of a snoop hit if the snoop hit signal is input while the page hit is present. Thus, as the DMA signal is toggled (changed between the active and inactive state) it can be seen how the system dynamically changes snoop comparison granularity between a page address and a sector address.

Therefore, the present invention modifies the snoop comparison logic of IOCC 7 such that the snoop comparison granularity dynamically changes between a page address portion and the sector address portion. In this manner the sector address is completely ignored during periods of activity by a DMA busmaster device when the device may cause the address used for a snoop comparison to be updated asynchronously.

It can be seen that if page address granularity is used for snooping operations, it is possible that an active DMA busmaster device, and another device on system bus 5 (such as CPU 1) will want access to data in different memory address sectors which are on the same page. In this case, a snoop hit will occur because of the page address granularity. If the DMA busmaster device is accessing data in cache 9 when a snoop hit occurs, IOCC 7 then issues an ARTRY signal which tells the device requesting the data to wait until the DMA busmaster activity is stopped, at which time IOCC 7 will not intervene (e.g. cease issuing an ARTRY) to prevent a transfer of ownership of the data. In this first case, the present invention avoids non-coherent data between various memory locations (L1 caches and system memory) in the data processing system when another device connected to system bus 5 requests a memory sector address on the same page as a memory sector address being accessed by a DMA busmaster device.

In another case, the active DMA busmaster device may cause a snoop hit by requesting data which the IOCC must fetch from a memory sector address which is owned by another device. That device will detect a snoop hit and will hold off the IOCC while it performs required coherency maintenance actions, such as writing a modified copy of the requested sector to memory. When IOCC 7 is unable to provide the data requested by the I/O busmaster, the IOCC holds off said busmaster and deasserts (deactivates) its DMA active signal. When DMA is inactive the IOCC snoops the CPU bus using sector granularity and, additionally, will respond to a snoop hit by invalidating its (unmodified) copy of the requested sector, i.e. the unmodified copy of the sector in the cache 9 of IOCC 7 is invalidated.

In the previous case, a snoop hit will occur, regardless of the memory sector address, since the DMA busmaster device is active and the snoop comparison granularity is at the page address level. However, since the DMA busmaster has requested data with a different page address from the data currently being accessed (as determined by comparator 30 of FIG. 3 when the busmaster device presents an address for a new page), the previously described reset activities occur wherein the DMA busmaster becomes inactive and the latch 15 of FIG. 3 is synchronously updated with an address based on the CPU clock.

In this manner, I/O Bus master devices can asynchronously transfer data between cache 9, and any snoop operation initiated based on the CPU clock is assured of having a valid address to use for a snoop comparison since a page address granularity is used. Therefore, it can be seen that little or no degradation in system performance will occur by briefly holding off activity on I/O bus 13 when a new page is addressed by the busmaster device.

Those skilled in the art will understand that although the present invention has been described in terms of a data transfer between a busmaster device and an IOCC, the present invention will provide cache coherency between any device which accesses data in system memory synchronously with a system bus, while its L1 cache is being updated asynchronously with respect to the system bus.

Although certain preferred embodiments have been shown and described, it should be understood that many changes and modifications may be made therein without departing from the scope of the appended claims.

We claim:

1. A method of maintaining cache coherency in a system using a snooping protocol wherein a snoop comparison, occurs at a time based on a CPU clock, comprising the steps of:

requesting, by a busmaster device, ownership of data from a memory by presenting an address having a page portion and a sector portion;

actively accessing said data in an internal cache of a first device asynchronously with said CPU clock; and exclusively using the page portion of said address to implement said snoop comparison during the time when said internal cache is being actively accessed.

2. A method according to claim 1 further comprising the step of preventing another device from obtaining access to said data when said data is being actively accessed.

3. A method according to claim 2 further comprising the step of using the page portion and the sector portion of said address to implement said snoop comparison during the time when said internal cache is not being actively accessed.

4. A method according to claim 3 further comprising the step of invalidating said data in said first device upon determining that another device has requested said data during the time when the internal cache is not being actively accessed.

5. A data processing system that maintains cache coherency using a snooping protocol wherein a snoop comparison, occurs at a time based on a CPU clock, comprising:

means for requesting ownership of data from a memory by presenting an address having a page portion and a sector portion;

means for actively accessing said data in an internal cache of a first device asynchronously with said CPU clock; and means for exclusively using the page portion of said address to implement said snoop comparison during the time when said internal cache is being actively accessed.

6. A system according to claim 5 further comprising means for preventing another device from obtaining access to said data when said data is being actively accessed.

7. A system according to claim 6 further comprising means for using the page portion and the sector portion of said address to implement said snoop comparison during the time when said internal cache is not being actively accessed.

8. A system according to claim 7 further comprising means for invalidating said data in said first device upon determining that another device has requested said data during the time when the internal cache is not being actively accessed.

9. A system according to claim 8 wherein said first device is an input/output controller that provides an interface between a system bus and an input/output bus.

10. A system according to claim 9 wherein said means for actively accessing is an input/output device connected to said input/output controller which directly accesses data in said memory, independent of intervention by said CPU.

11. A system according to claim 5 further comprising means for dynamically changing the granularity used for said snoop comparison between said page portion exclusively, and said page portion and said sector portion, based on the state of said input/output device.

12. A system according to claim 11 wherein said means for dynamically changing comprises a logic circuit contained on said input/output controller.

13. A method of maintaining cache coherency in a system using a snooping protocol wherein a snoop comparison, occurs at a time based on a CPU clock, comprising the steps of:

requesting, by a busmaster device, ownership of data from a memory by presenting an address having a page portion and a sector portion;

actively accessing said data in an internal cache of a first device asynchronously with said CPU clock;

using only the page portion of said address to implement said snoop comparison during the time when said internal cache is being actively accessed;

preventing another device from obtaining access to said data when said data is being actively accessed; and using the page portion and the sector portion of said address to implement said snoop comparison during the time when said internal cache is not being actively accessed.

14. A method according to claim 13 further comprising the step of invalidating said data in said first device upon determining that another device has requested said data during the time when the internal cache is not being actively accessed.

15. A data processing system that maintains cache coherency using a snooping protocol wherein a snoop comparison, occurs at a time based on a CPU clock, comprising:

means for requesting ownership of data from a memory by presenting an address having a page portion and a sector portion;

means for actively accessing said data in an internal cache of a first device asynchronously with said CPU clock;

means for using only the page portion of said address to implement said snoop comparison during the time when said internal cache is being actively accessed;

means for preventing another device from obtaining access to said data when said data is being actively accessed; and means for using the page portion and the sector portion of said address to implement said snoop comparison during the time when said internal cache is not being actively accessed.

16. A system according to claim 15 further comprising means for invalidating said data in said first device upon determining that another device has requested said data during the time when the internal cache is not being actively accessed.

17. A system according to claim 16 wherein said first device is an input/output controller that provides an interface between a system bus and an input/output bus.

* * * * *